United States Patent
Spain et al.

[11] 3,907,352
[45] Sept. 23, 1975

[54] BREAK AWAY FRONT TRUCK BUMPER

[76] Inventors: William H. Spain; George Spector, both of 3615 Woolworth Bldg., 233 Broadway, New York, N.Y. 10007

[22] Filed: Feb. 12, 1974

[21] Appl. No.: 441,764

[52] U.S. Cl. .................................. 293/76; 293/99
[51] Int. Cl. ........................................ B60r 19/04
[58] Field of Search ............ 293/70, 75, 76, 77, 78, 293/79, 85, 98, 99, DIG. 3, 71, 89

[56] References Cited
UNITED STATES PATENTS
3,081,119  3/1963  Dison .............................. 293/71 R
3,596,963  8/1971  Phillips .............................. 293/76

Primary Examiner—Richard A. Schacher
Assistant Examiner—Robert Saifer

[57] ABSTRACT

An improved bumper for an automotive vehicle which in case of a front collision near its end does not get bent into the vehicle wheel and lock the steering; the bumper being formed of separate end sections bolted to a central main section so that in case of a collision, the end section simply breaks off and falls away so to not interfere with the front wheel steering.

2 Claims, 5 Drawing Figures

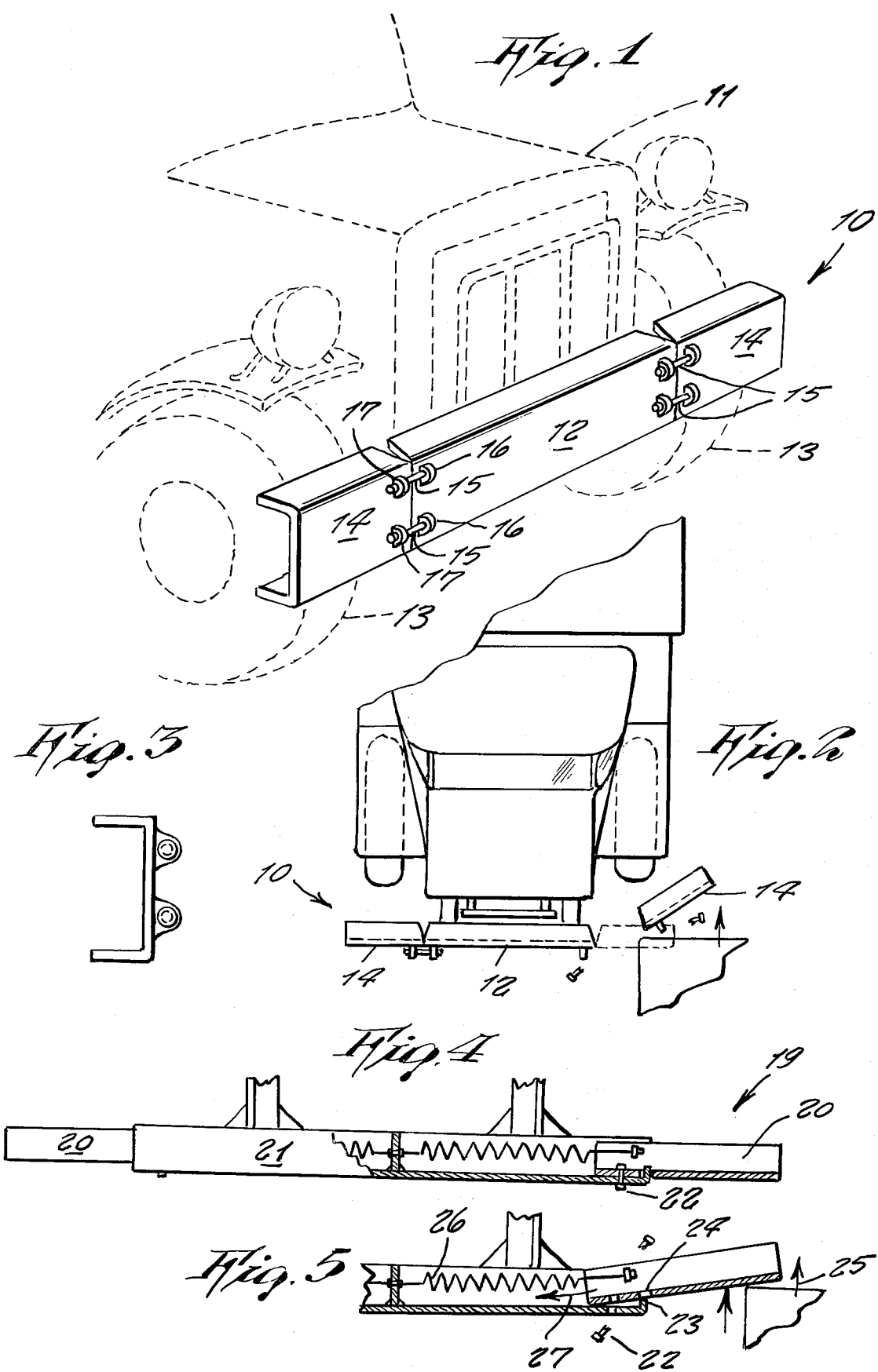

BREAK AWAY FRONT TRUCK BUMPER

This invention relates generally to automotive vehicles. More specifically it relates to automotive vehicle bumpers.

It is well known that when a conventional front bumper is hit near either end in a collision, there is always a danger of the bumper becoming bent into the front wheel so that the vehicle steering becomes locked thus causing the driver to lose control. This situation is, of course, serious and, therefore, in want of an improvement. This dangerous situation is present in passenger automobiles and particularly in heavy duty trucks.

Accordingly, it is a principle object of the present invention to provide an improved bumper for front bumper installation, wherein the bumper will not bend into the wheels in case the vehicle strikes another object.

Yet another object is to provide an improved bumper wherein the bumper ends readily break off and fall away in case of collision so to not jam into the wheel.

Yet another object is to provide an improved bumper wherein the broken away bumper sections can be readily retrieved after falling down due to a collision and are cheaper to remount than straightening a conventional bent up bumper.

Other objects are to provide a break away bumper that is simple in design, inexpensive to manufacture, rugged in construction, easy to use and efficient in operation.

These and other objects will be readily evident upon a study of the following specification and the accompanying drawing wherein:

FIG. 1 is a perspective view of the present invention.

FIG. 2 is a top view of a truck during a collision with another object and showing the bumper end section snapping off.

FIG. 3 is a side end-view of the invention.

FIG. 4 is a top view shown partly in cross section and illustrating a modified design of the invention wherein the bumper break away end section is not allowed to drop into the street or roadway during a collision, but as shown in FIG. 5, after being broken away in a collision it slides behind the main section of the bumper.

FIG. 5 is a view similar to FIG. 4 shown in subsequent action.

Referring now to the drawing in detail, and more particularly to FIGS. 1 to 3 at this time, the reference numeral 10 represents a break away bumper according to the present invention wherein the same is mountable upon a front end of an automotive vehicle 11. The bumper 10 includes a major central section 12 that is secured stationarily to the vehicle frame, and which is of a length that is less than the distance between the front wheels 13 so that no portion thereof is in front of the wheels.

At each opposite end of central section 12, a break away bumper end section 14 is secured by bolts 15 passed through lugs 16 and 17 of the central and end sections respectively. The sections 14 protect the remaining front end portions of the vehicle body and are located directly in front of the wheels 13.

Accordingly, in case the vehicle collides at its ends with other objects, instead of the bumper bending into the wheel, the end sections 14 break away by breakage of the bolts 15, thus allowing the end section to fall, without jamming the wheel. After being picked up they can be easily remounted with new bolts, as the sections tend not to being deformed in a collision; the excess stress having been taken by the sheared bolts.

In FIGS. 4 and 5, a modified design of break away bumper 19 has the end sections 20 to slide behind the main section 21 instead falling sown on a road where the wheels might run over them so to cause possible damage to the tire or throw the vehicle sidewardly.

In this form of the invention, the end section is secured to the main section by frangible bolts 22. A bent over lug 23 on the end of section 21 also is fitted into slot 24 on end section 20. In case of collision, the end section is moved in direction of arrow 25 thus breaking the bolt and moving the slot 24 away from the lug 23, thus freeing the end section so to be pulled by tension spring 26 behind the central section 21 as shown by arrow 27. Thereafter the end section can be re-set with new bolts 22.

Thus a modified design has been provided.

While various changes may be made in the detail construction, it is to be understood that such changes will be within the spirit and scope of the present invention as is defined by the appended claims.

What is claimed is as follows:

1. A break away bumper assembly for a motor vehicle, comprising a central bumper mounted rigidly on the front end of the vehicle extending to planes parallel to and spaced from the inner surfaces of the front wheels of the vehicle in combination with a pair of extensions attached to opposite ends of said central bumper by frangible bolts secured to the central bumper and to each extension, wherein each bolt overlaps adjacent portions of the central bumper and each extension, said extensions projecting from the opposite ends of the central bumper to vertical planes parallel to and outward of the outer surfaces of the front wheels wherein the extensions and the central bumper have front surfaces in planar alignment and include aligned lugs mounted on said surfaces to receive said bolts spaced from and parallel to said surfaces, whereby collision impact on said extensions will break the bolts causing the extensions to fall away from the central bumper for possible further usage thereon.

2. An assembly as in claim 1 wherein the extensions each abut and overlap the ends of the central bumper and include transverse aligned holes adapted to receive said bolts in further combination with means further locking the extensions and the central bumper preventing sliding motion of the extensions relative to the central bumper, said means being responsive to collision impact on the extensions to release the extensions and permit sliding motion relative to the central bumper, in still further combination with retracting means urging the extensions to a position behind and secured to the central bumper.

* * * * *